United States Patent [19]

Michaels

[11] Patent Number: 5,005,617
[45] Date of Patent: Apr. 9, 1991

[54] ROUTER GUIDE

[76] Inventor: John Michaels, 7454 Shawnee Rd., North Tonawanda, N.Y. 14120-1368

[21] Appl. No.: 510,046

[22] Filed: Apr. 17, 1990

[51] Int. Cl.$^5$ .................. B27C 5/10; B43L 13/02
[52] U.S. Cl. .................. 144/134 D; 33/41; 144/1 F; 144/136 C; 409/182
[58] Field of Search .................. 409/130, 182; 33/42; 144/134 D, 136 C, 144 R, 1 F, 371

[56] References Cited

U.S. PATENT DOCUMENTS

| | | | |
|---|---|---|---|
| Re. 33,045 | 9/1989 | Cronholz | 144/136 C |
| 2,726,690 | 12/1955 | Schacher | 144/144 R |
| 2,970,618 | 2/1961 | Mitchell | 144/136 C |
| 3,087,520 | 4/1963 | Fielder | 144/136 C |
| 3,981,226 | 9/1976 | White | 144/134 D |
| 4,252,164 | 2/1981 | Norlander | 144/134 D |
| 4,640,324 | 2/1987 | Lounds | 144/144 R |

Primary Examiner—W. Donald Bray

Attorney, Agent, or Firm—Luedeka, Hodges, Neely & Graham

[57] ABSTRACT

A guide device securable to a hand-held router facilitates the guiding of the router across a thin workpiece so that the rotatable cutting tool of the router severs the workpiece along a prescribed cutting path and so that the prescribed cutting path corresponds with an edge of an object underlying the workpiece. The guide device includes a platen body which moves between the workpiece and the underlying object as the router is moved across the workpiece, and the body includes a lengthy abutment surface positionable in abutting engagement with the edge of the underlying object. When moving the router across the workpiece while maintaining the abutment surface in abutting relationship with the edge of the underlying object, the cutting tool of the router moves in cutting engagement with the workpiece along the prescribed cutting path.

15 Claims, 3 Drawing Sheets

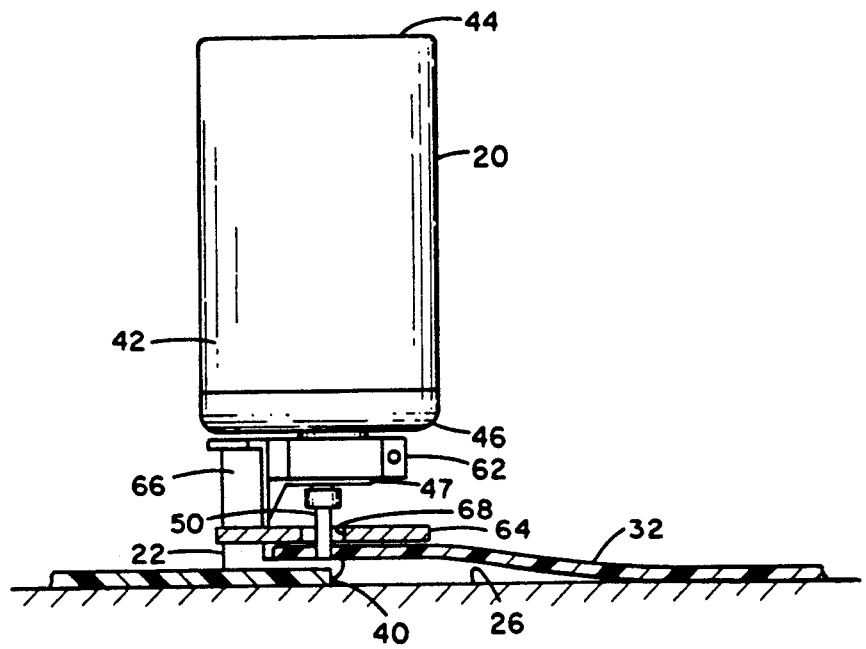
Fig. 4
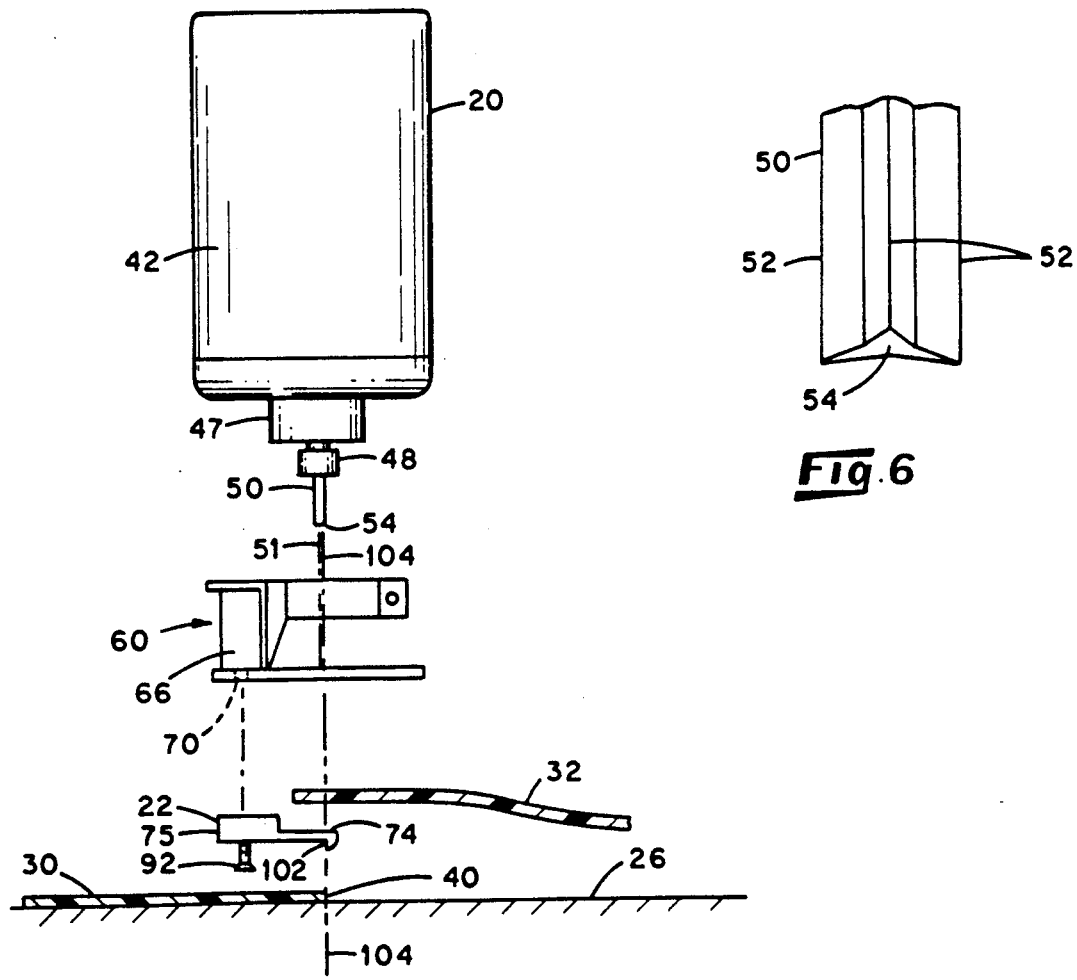
Fig. 5
Fig. 6

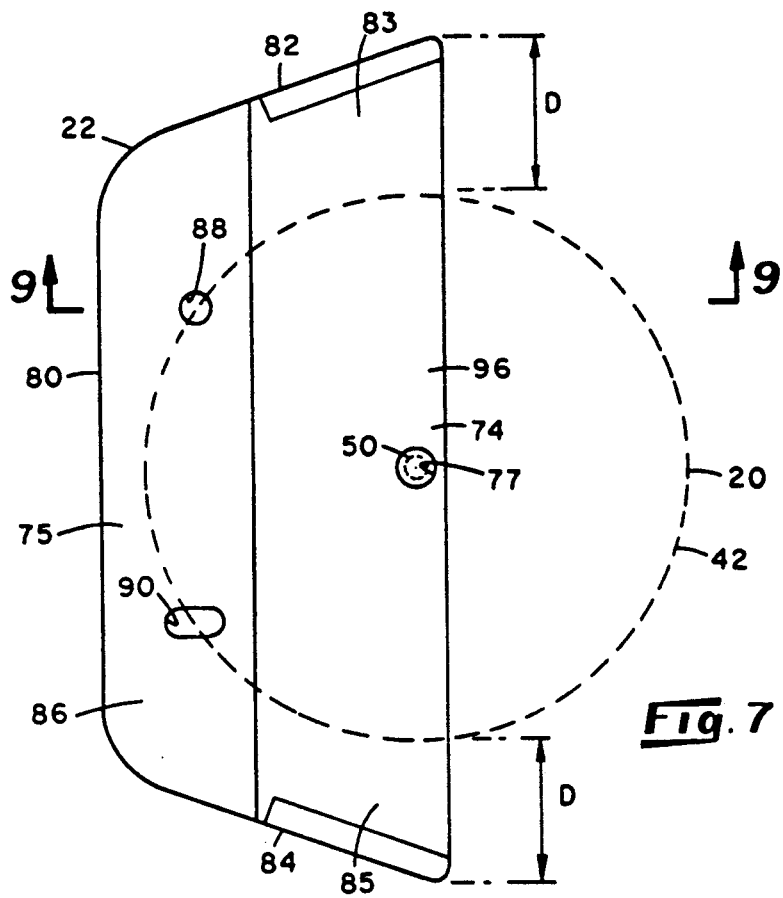
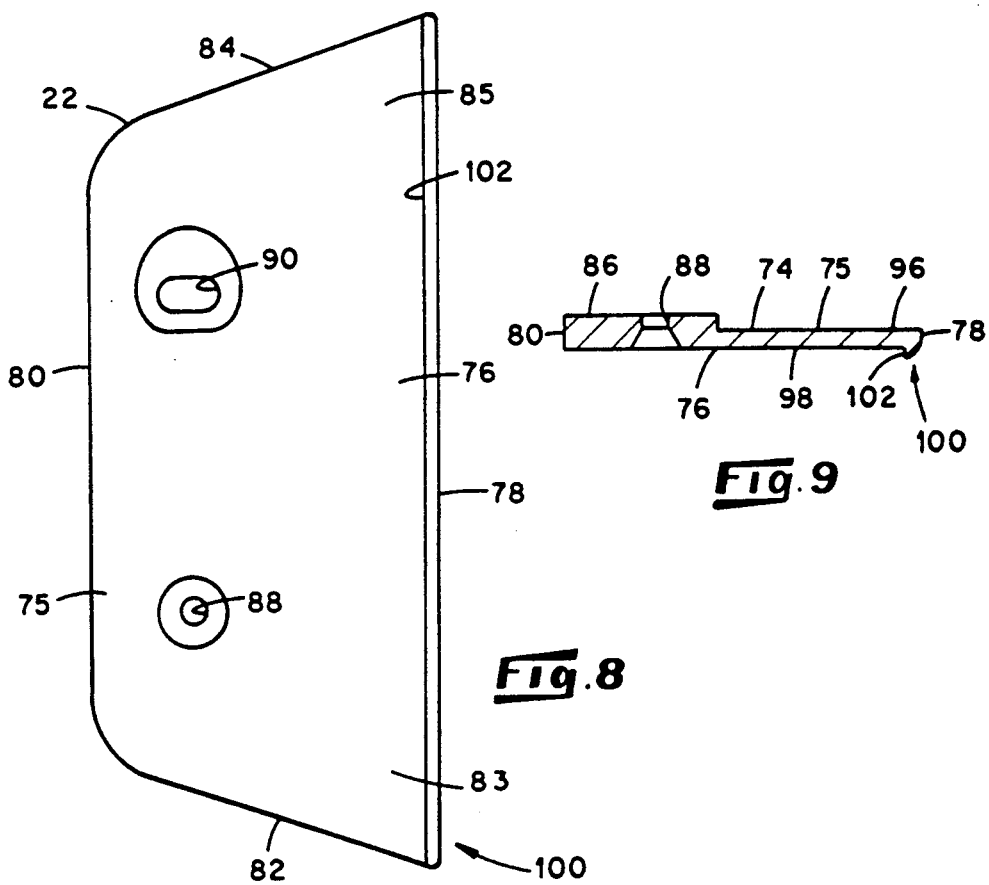

ROUTER GUIDE

BACKGROUND OF THE INVENTION

This invention relates generally to routers and router accessories and relates more particularly to a guide device for attachment to a hand-held router for guiding the movement of the router along a desired cutting path.

The type of router with which this invention is concerned includes a housing capable of being manipulated across a workpiece with the hands, a motor mounted within the housing and a rotatable bit-like cutting tool operatively coupled to the motor so as to extend from one end of the housing. When using the router, the router is moved across a workpiece with its cutting tool in cutting engagement therewith so that the rotation of the tool is substantially perpendicular to the direction of movement of the router across the workpiece.

The type of guide device with which this invention is to be compared is attached to a router of the aforedescribed type to facilitate the guiding of the router across a relatively thin workpiece so as to sever the workpiece along a cutting path and so that the cutting path corresponds with a preselected edge of an object underlying the workpiece. For example, in an application in which a flat surface, such as a table top, is desired to be covered by two pieces of thin, relatively rigid sheets of plastic laminate material, neither of which is large enough to completely cover the table top surface, the router and guide are used to cut one of the sheets so that the resulting, i.e., cut, edge of the one sheet can be properly positioned adjacent an edge of the other sheet.

To prepare the sheets for a cutting operation, a first of the sheets is operatively secured in its desired position upon the table top so that a preselected edge of the first sheet extends across the table top, and the second, or remaining, sheet is placed upon the table top so that a portion of the second sheet overlaps the preselected edge of the first sheet. The guide device is attached to the router adjacent its cutting tool for movement generally between the first sheet and the overlapping portion of the second sheet while the router housing is directed across the second sheet with its cutting tool in cutting engagement with the second sheet. In order that the resulting edge of the second sheet corresponds to the preselected edge of the first sheet, the guide includes an engagement surface for engaging the edge of the first sheet so that when the router is moved across the second sheet and the guide engagement surface is maintained in sliding engagement with the preselected edge of the first sheet, the cutting tool of the router cuts the second sheet in two along the desired path. Once the overlapping portion of the second sheet has been completely severed from the remainder of the second sheet, the second sheet can be secured to the table top surface so that its resulting, i.e., cut, edge is positioned adjacent the preselected edge of the first sheet.

One limitation associated with a prior art guide device of the aforedescribed type relates to the initiation of a cut in the second sheet along the appropriate cutting path. More specifically, the construction of the prior art device renders it difficult for a user to know, at the outset of a cutting operation, the actual position of the guide relative to the preselected edge of the first sheet so that when the cut is initiated, the cutting tool will advance along the appropriate path. If, of course, the engagement surface of the guide is not accurately positioned against the preselected edge of the first sheet at the outset of a cutting operation, the router will begin its cut along an erroneous path.

Another limitation associated with a conventional guide device of the aforedescribed type relates to the susceptibility of its engagement surface to pivot leftwardly or rightwardly relative to the preselected edge of the underlying first sheet as the router is moved across the second sheet. Such a pivoting of the engagement surface is, of course, undesirable because the pivoting action shifts the cutting tool out of the desired cutting path.

It is, accordingly, an object of the present invention to provide a new and improved guide for a router facilitating the guiding of the router across a workpiece so that the router severs the workpiece along a prescribed cutting path corresponding with an edge of an object underlying the workpiece.

Another object of the present invention is to provide such a guide which circumvents limitations associated with guide devices of the prior art.

Still another object of the present invention is to provide such a guide which is uncomplicated in construction and effective in operation.

Yet another object of the present invention is to provide a router assembly which includes such a guide.

SUMMARY OF THE INVENTION

This invention resides in a guide for a hand-held router facilitating the guiding of the router across a relatively thin workpiece so that the router severs the workpiece along a prescribed cutting path and so that the prescribed cutting path corresponds with an edge of an object underlying the workpiece.

The guide is comprised of a platen body fixedly securable to the router adjacent the cutting tool of the router so that as the router is manually moved across the top of the workpiece so that the cutting tool moves in cutting engagement with the workpiece, the platen body moves below the workpiece and above the object underlying the workpiece.

The platen body also includes means providing an abutment surface for positioning in abutting engagement with the edge of the underlying object. By moving the router across the workpiece while maintaining the abutment surface in abutting relationship with the edge of the underlying object, the cutting tool moves in cutting engagement with the workpiece along a cutting path which corresponds with the edge of the underlying object.

The platen body further includes a forward portion for extending an appreciable distance along the cutting path in advance of the cutting tool and a rearward portion for extending an appreciable distance along the cutting path so as to trail the cutting tool. Because the forward and rearward portions of the platen body extend for an appreciable distance along the cutting path, a user can easily view the guide body when positioning the abutment means in operative relationship with the edge of the underlying object at the outset of a cutting operation.

In addition, the abutment surface extends along the length of the forward and rearward portions of the platen body for engaging the edge of the underlying object for a substantial distance therealong. As the abutment surface is maintained in abutting relationship with the edge of the underlying object, the likelihood that

BRIEF DESCRIPTION OF THE DRAWINGS

FIG. 4 is an end elevational view, shown partially in section, of the FIG. 1 assembly and sheets.

FIG. 5 is a view similar to that of FIG. 4 shown exploded.

FIG. 6 is a perspective view of a fragment of the cutting tool of the FIG. 1 assembly.

FIG. 7 is a top plan view of the guide of the FIG. 1 assembly.

FIG. 8 is bottom plan view of the guide of the FIG. 1 assembly.

FIG. 9 is a cross-sectional view taken about on line 9—9 of FIG. 7.

DETAILED DESCRIPTION OF THE ILLUSTRATED EMBODIMENTS

Figure 1:
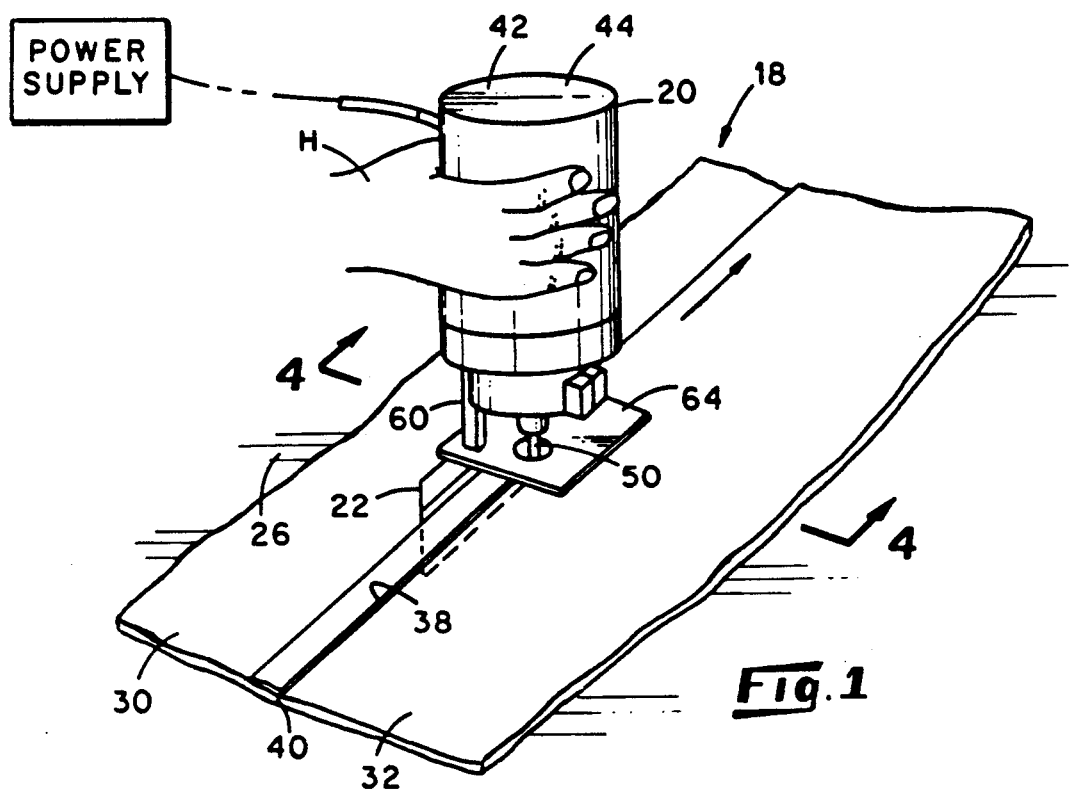
FIG. 1 is a perspective view of a router assembly within which an embodiment of a guide is incorporated for movement across two overlapping sheets of laminate material.
Figure 2:
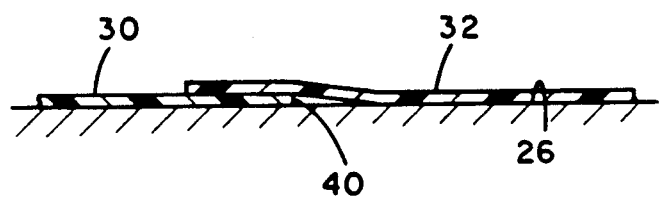
FIG. 2 is a transverse cross-sectional view of the two sheets illustrated in FIG. 1 before one of the sheets is trimmed in a manner permitting the two sheets to be placed in a side-by-side relationship.

Turning now to the drawings in greater detail and considering first FIG. 1, there is shown a router assembly 18 including a router 20 and a guide 22 attached beneath the router 20. As the router 20 is manually moved across and in cutting engagement with a workpiece, the guide 22 guides the movement of the router 20 along a predetermined path. In the illustrated exemplary environment of use, the surface of a table top 26 is being laminated with two sheets 30, 32 of thin, relatively rigid material, neither of which is large enough to entirely cover the surface of the table top 26. The sheets 30, 32 may be constructed of Formica® or similar material. As shown in FIG. 2, a first sheet 30 has been placed over the table top surface so as to cover one portion of the table top 26, and the second sheet 32 has been placed over the table top surface so as to cover the remaining portion of the table top 26 and so that one edge portion of the second sheet 32 overlaps a linear edge 40 of the first sheet 32.

Figure 3:
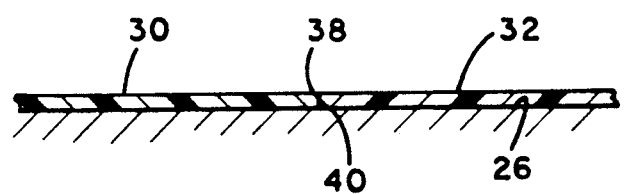
FIG. 3 is a view similar to that of FIG. 2 after one of the two sheets has been appropriately trimmed and the sheets are placed in a side-by-side relationship.

With the first and second sheets 30, 32 placed in overlying relation with the table top 26 in the manner illustrated in FIGS. 1 and 2, the router 26 is used to trim, or cut, the overlapping edge portion from the second sheet 32 to form a new edge 38 which extends along so as to correspond with the edge 40 of the first sheet 32. That is to say, the new edge 38 is formed along the second sheet 32 so that the second sheet 32 may be placed in a flat condition over the table top surface beside the first sheet 30, as shown in FIG. 3, and so that the formed edge 38 is positioned closely adjacent the sheet edge 40. In the finished arrangement depicted in FIG. 3, the edges 38 and 40 abut one another. As is explained in greater detail herein, the guide 22 cooperates with the linear edge 40 of the first sheet 30 as the router 20 is moved across the second sheet 32 so that the path followed by the router 20 corresponds with the sheet edge 40.

With reference to FIGS. 4 and 5, the router 20 includes a housing 42 having two opposite ends 44, 46 and a motor (not shown) mounted within the housing 42 so that the rotatable shaft of the motor extends through the housing end 46. Depending downwardly, as viewed in FIG. 4, from the housing end 46 is a neck 47 which encircles the lower end of the motor shaft. Arranged in axial registry with the motor shaft beneath the router housing 42 is a bit-like cutting tool 50 and a spindle 48 for connecting the cutting tool 50 to the motor shaft in a conventional manner. As shown in FIG. 5, the cutting tool 50 is attached to the spindle 48 for rotation about its longitudinal axis 51 and has a plurality of axially-extending cutting edges 52 (FIG. 6) which terminate at a tip 54. As best shown in FIG. 6, the cutting tool 50 is relatively narrow as a path is traced toward the tip 54 and is of a type commonly used in underscribe routing applications. In the depicted assembly 18, the cutting tool 50 is sized to cut a path through a workpiece which is about 0.375 inches in width. The router 20 is conventional and available from Bosch under the trade designation 1608 Trim Router.

With reference again to FIGS. 4 and 5, the guide 22 is supportedly attached to the housing 42 adjacent the housing end 46 so that the cutting tool 50 is oriented generally perpendicular to the guide 20 and so that the tip 54 of the tool 50 is positioned adjacent the guide 20. For supporting the guide 22 in such a relationship with the router 20, the router assembly 18 includes a head assembly 60 interposed between the router 20 and the guide 22. As best shown in FIG. 5, the head assembly 60 includes a collar 62 which is releasably securable about the router neck 47 and a plate portion 64 attached to the collar 62 by means of a connecting portion 66. The plate portion 64 includes a central opening 68 for receiving the tip 54 of the cutting tool 50 and is supported by the connecting portion 66 in a generally parallel relationship with the collar 62. Therefore, when the collar 62 is operatively secured about the router neck 47, the central opening 68 of the plate portion 64 receives the tool tip 54 and the plate portion 64 is oriented generally perpendicular to the rotational axis 51 of the tool 50. For purposes of securing the guide 22 to the head assembly 60, there are provided two internally-threaded openings 70 in the bottom of the plate portion 64.

With reference to FIGS. 7-9, the guide 22 includes a relatively thin platen body 75 having a top surface 74 and a bottom surface 76. As viewed in the plan view of FIG. 7, the platen body 75 is trapezoidal in shape and defines a long side edge 78 and an opposite and parallel shorter side edge 80. Two substantially linear end edges 82, 84 join the side edges 78, 80 and provide, respectively, leading and trailing ends of the guide 22 as the router 20 is moved across the overlapping portions of the sheets 30, 32. Providing the leading and forward end edges 82, 84 of the body 75 are forward and rearward portions 83 and 85, respectively. For purposes of joining the guide 22 to the head assembly 60, there is provided in the guide body 75 a thick portion 86 adjacent the short side edge 80 and a pair of openings 88, 90 extending therethrough. For providing a clearance opening within which the tip of the cutting tool 50 (having a position above the top surface 74 as illustrated in phantom in FIG. 7), there is defined in the top surface 74 a circular recess 77 positioned in registry with the cutting tool 50 and having a diameter which is at least as large as the diameter of the cutting tool 50.

To secure the guide 20 to the head assembly 60, the guide 22 is positioned against the bottom of the plate portion 64 (FIGS. 4 and 5) of the head assembly 60 so that each opening 88, 90 is aligned with a corresponding one of the threaded openings 70. Threaded fasteners 92 (FIG. 5) are then inserted through the openings 88, 90 and tightened within the plate portion openings 70. Once the fasteners 92 are tightened within the plate portion 64, the guide body 75 is tightly held between the bottom of the plate portion 64 and the heads of the fasteners 92. In order that the heads of the fasteners 92 do not extend below the bottom surface 76 of the guide body 75 when tightened within the plate portion 64, the openings 88, 90 are countersunk from the body surface 76 for receiving the fastener heads.

During a cutting operation with the router assembly 18, the guide 22 is positioned and moved generally between the sheets 30, 32 as the router housing 42 is manually moved above the sheet 32, and the cutting tool 50 is moved in cutting engagement with the second sheet 32. In this connection, the top surface 74 of the guide body 75 has a planar portion 96 for slidably moving along the bottom of the sheet 32 as the router 20 is moved along the cutting path, and the bottom surface 76 of the guide body 75 includes a planar portion 98 for slidably moving along the top of the sheet 30. To facilitate insertion of the guide body 75 between the sheets 30, 32, at least a section of the end edges 82, 84 are beveled.

With reference to FIGS. 8 and 9, the platen body also includes abutment means 100 providing a substantially planar abutment surface 102 associated with the bottom surface of the platen body 75 for abuttingly engaging the sheet edge 40 (FIGS. 4 and 5) and slidably moving along the sheet edge 40 as the router 20 is moved across the sheet 32. As best shown in FIG. 8, the abutment surface 102 is generally parallel to the long edge 78 of the guide body and substantially extends along the entire length of the edge 78. In addition, the abutment surface 102 depends downwardly from and at generally a right angle to the planar surface portion 98, of the guide body 75, as best shown in FIG. 9.

By moving the router 20 across the sheet 32 while manually maintaining the abutment surface 102 in abutting relationship with the sheet edge 40, the cutting tool 50 moves along the desired cutting path through the sheet 32, which cutting path corresponds with the sheet edge 40. To this end, the plane, indicated 104 in FIG. 5, of the abutment surface 102 is slightly offset to one side of the rotational axis 51 of the cutting tool 50 and tangential to the rotational path traced by the edges of the cutting tool 50. Accordingly and as viewed in FIG. 5, the abutment surface plane 104 is offset to the right of the rotational axis 51 opposite the sheet 30 and tangential to the periphery of the tool 50. Therefore, when the abutment surface 102 is positioned in abutting engagement with the edge 40 of the sheet 30, as shown in FIG. 4, the cutting tool 50 is in position to form a new edge 38 (FIGS. 1 and 3) in the sheet 32 as the tool 50 is moved in cutting engagement therethrough so that the new edge 38 is located in about the plane of the abutment surface 102. Once the overlapping portion of the sheet 32 has been completely severed from the remainder of the sheet 32 so as to form the new edge 38, the remainder of the sheet 32 can be placed in a side-by-side relationship with the sheet 30 atop the tabletop surface, as shown in FIG. 3, so that the edges 38 and 40 are positioned closely adjacent one another.

To initiate the desired cut across the sheet 32, the router assembly 18 is placed in the FIG. 4 position relative to the sheets 30, 32 so that the guide 22 is positioned between the sheet 30 and the overlapping portion of the sheet 32, the abutment surface 102 of the guide 22 abuts the sheet edge 40, and the tool 50 is adjacent the sheet 32 to effect a cut along the desired path. It is a feature of the guide 22 that the forward portion 83 of the guide body 75 extends an appreciable distance along the cutting path in advance of the cutting tool 50 as the tool 50 is positioned and moved along the desired cutting path and that the rearward portion 85 extends an appreciable distance along the desired cutting path behind the cutting tool 50. Therefore, the forward and rearward portions 83, 85 can be easily seen around the router housing 42 by the user as he manipulates the guide 22 between the sheets 30 and 32. The ease with which the forward and rearward portions 83 and 85 can be viewed by a user is in sharp contrast to router guides of the prior art which are so small that when secured beneath a router, the router substantially hides the guide from view.

For exemplary purposes, and with reference again to the plan view of FIG. 7, there is outlined in phantom the outer periphery of the router housing 42 when operatively attached to the guide 22. As seen in the FIG. 7 view, the forward and rearward portions 83, 85 extend an appreciable distance D forwardly and rearwardly of the router housing 42 relative to the desired cutting path. Preferably, the distance D is at least 1.0 inch to enhance the viewability of the guide 22 around the router housing 42. Therefore, when positioning the router assembly 18 in operative relationship with the sheets 30, 32 at the outset of a cutting operation, the abutment means 100 can be quickly and easily positioned in abutting relationship with the sheet edge 40.

Once the desired cut has been initiated in the sheet 32, the router 20 is manually moved by the user's hand H (FIG. 1) across the sheet 32 while the abutment surface 102 is maintained in abutting engagement with the sheet edge 40. In order to maintain the abutment surface 102 against the sheet edge 40 as aforedescribed, the user urges the router 20 generally to one side of the cutting path corresponding with the sheet edge 40 (i.e., generally against the sheet edge 40) as the router 20 is simultaneously urged across the sheet 32. The cutting path consequently followed by the cutting tool 50 corresponds to the desired cutting path.

Another advantage provided by the guide 22 relates to the stability of the router 20 relative to the sheet edge 40 as the guide 22 is guided therealong. More specifically, as the router 20 is urged against the sheet edge 40 as the router 20 is advanced along the cutting path, any likelihood that the router 40 will twist in the user's hand H so as to pivot the abutment surface 102 about one of its ends and relative to the sheet edge 40 is substantially reduced. Such a stability of the router 20 is believed to be due to the appreciable distance along the sheet edge 40 that the abutment surface 102 extends when operatively positioned thereagainst. Preferably, the length of the abutment surface 102 as measured between the leading and trailing end edges 82, 84 (FIG. 7) is greater than 4.0 inches, such as for example 5.5 inches, for engagement of the sheet edge 40 by the abutment surface 102. Such a feature is in contrast to prior art router guides which engage the edge of an underlying sheet along no more than about 4.0 inches of its length and do little to prevent the router to which it is attached from twisting within the user's hand when used.

It will be understood that numerous modifications and substitutions can be had to the aforedescribed guide 22 without departing from the spirit of the invention. Accordingly, the guide 22 is intended for the purpose of illustration and not as limitation.

I claim:

1. A guide facilitating the guide of a hand-held router across a relatively thin workpiece so that the rotatable cutting tool of the router severs the workpiece along a prescribed cutting path and so that the prescribed cutting path corresponds with an edge of an object underlying the workpiece, said guide comprising:

a platen body fixedly securable to the router adjacent the cutting tool thereof so that as the router is manually moved across the top of the workpiece so that the cutting tool moves in cutting engagement with the workpiece, the platen body moves below the workpiece and above the object underlying the workpiece;

said platen body including abutment means providing an abutment surface positionable in abutting engagement with the edge of the underlying object so that by moving the router across the workpiece while maintaining the abutment surface in abutting relationship with the edge of the underlying object, the cutting tool moves in cutting engagement with the workpiece along a cutting path which corresponds with the edge of the underlying object;

said platen body having a forward portion for extending an appreciable distance along the cutting path in advance of the cutting tool and for a distance which is of least 1.0 inch forwardly of the router and a rearward portion for extending an appreciable distance along the cutting path so as to trail the cutting tool and for a distance which is at least 1.0 inch rearwardly of the router so that a user can easily view the platen body when positioning the abutment surface in abutting relationship with the edge of the underlying object at the outset of a cutting operation; and said abutment surface extending along the length of the forward and rearward portions of the platen body for engaging the edge of the underlying object at two points therealong which are at least 4.0 inches apart so that as the abutment surface is maintained in abutting relationship with the edge of the underlying object, the likelihood that the platen body will pivot relative to the underlying object edge and thereby shift the cutting tool to one side of the desired cutting path is relatively small.

2. The guide as defined in claim 1 wherein said abutment surface is continuous as a path is traced along the length of the forward and rearward portions.

3. The guide as defined in claim 1 wherein said platen body is trapezoid in shape when viewed in plan so that one of the two parallel edges of the platen body is longer than the other of the parallel edges of the body, and said abutment means is associated with the longer edge of said body so that the abutment surface extends generally therealong.

4. The guide as defined in claim 1 wherein said platen body includes a bottom surface having a flat portion for slidably moving across the underlying object as the router is moved across the workpiece and the abutment means is associated with the bottom surface so that the abutment surface protrudes generally away from the plane of said flat portion for abuttingly engaging the edge of the underlying object as aforesaid.

5. A guide for a hand-held router having a housing and a rotatable cutting tool extending from the housing for cutting a relatively thin workpiece along a prescribed cutting path so that the prescribed cutting path corresponds with a linear edge of an object underlying the workpiece, said guide comprising:

a platen body fixedly securable in a spaced relationship with the housing of the router so that the plane of the platen body is oriented adjacent and generally perpendicular to the cutting tool of the router so that when the cutting tool of the router is moved in cutting engagement with the workpiece, the router housing moves along above the workpiece and the platen body moves along beneath the workpiece;

said platen body defining a top surface for slidably moving along the bottom of the workpiece as the router cutting tool is moved in cutting engagement with the workpiece and a bottom surface for slidably moving along the top of the underlying object as the cutting tool is moved in cutting engagement with the workpiece;

said platen body including abutment means associated with said bottom surface providing an abutment surface positionable in abutting engagement with the edge of the underlying object so that by moving the router across the workpiece to be cut and manually urging the router against the edge of the underlying object to maintain the abutment means in abutting relationship with the edge of the underlying object, the cutting tool moves in cutting engagement with the workpiece along a cutting path which corresponds with the edge of the underlying object;

said platen body having a forward portion for extending an appreciable distance along the cutting path in advance of the cutting tool and for a distance which is at least 1.0 inch forwardly of the housing of the router and a rearward portion for extending an appreciable distance along the cutting path so as to trail the cutting tool and for a distance which is at least 1.0 inch rearwardly of the housing of the router so that a user can easily view the platen body around the router housing when positioning the abutment surface in abutting relationship with the edge of the underlying object at the outset of a cutting operation; and said abutment surface extending along the length of the forward and rearward portions of the platen body for engaging the edge of the underlying object at two points therealong which are at least 4.0 inches apart so that as the router is manually urged against the edge of the underlying object to maintain the abutment surface in abutting relationship with the edge of the underlying object, the likelihood that the platen body will pivot relative to the underlying object edge and thereby shift the cutting tool to one side of the desired cutting path is relatively small.

6. The guide as defined in claim 5 wherein said abutment surface is continuous as a path is traced along the length of the forward and rearward portions so that the abutment surface continuously engages the edge of the underlying object along the length of the abutment surface.

7. The guide as defined in claim 5 wherein said platen body is trapezoid in shape when viewed in plan so that one of the two parallel edges of the platen body is longer than the other of the parallel edges of the body, and said abutment means is associated with the longer edge of said body so that the abutment surface extends generally therealong.

8. The guide as defined in claim 5 wherein said platen body includes a bottom surface having a flat portion for slidably moving across the underlying object as the router is moved across the workpiece and the abutment means is associated with the bottom surface so that the abutment surface protrudes generally away from the plane of said flat portion for abuttingly engaging the edge of the underlying object as aforesaid.

9. A router assembly including
a hand-held router having a housing and a rotatable cutting tool extending from the housing for cutting a relatively thin workpiece along a prescribed cutting path so that the prescribed cutting path corresponds with the edge of an object underlying the workpiece; and
a guide secured to the router facilitating the guiding of the router across the workpiece, said guide including a platen body fixedly securable to the router adjacent the cutting tool thereof so that as the router is manually moved across the top of the workpiece with its cutting tool in cutting engagement with the workpiece, the platen body moves below the workpiece and above the object underlying the workpiece,
said platen body including abutment means providing an abutment surface positionable in abutting engagement with the edge of the underlying object so that by moving the router across the workpiece while maintaining the abutment surface in abutting relationship with the edge of the underlying object, the cutting tool moves in cutting engagement with the workpiece along a cutting path which corresponds with the edge of the underlying object,
said platen body having a forward portion for extending an appreciable distance along the cutting path in advance of the cutting tool and for a distance which is at least 1.0 inch forwardly of the router housing and a rearward portion for extending an appreciable distance along the cutting path so as to trail the cutting tool and for a distance which is at least 1.0 inch forwardly of the router housing so that a user can easily view the platen body around the router housing when positioning the abutment surface in abutting relationship with the edge of the underlying object at the outset of a cutting operation, and
said abutment surface extending along the length of the forward and rearward portions of the platen body for engaging the edge of the underlying object at two points therealong which are at least 4.0 inches apart so that as the abutment surface is maintained in abutting relationship with the edge of the underlying object, the likelihood that the platen body will pivot relative to the underlying object edge and thereby shift the cutting tool to one side of the desired cutting path is relatively small.

10. The assembly as defined in claim 9 wherein said abutment surface of said guide body is continuous as a path is traced along the length of the forward and rearward portions.

11. The assembly as defined in claim 9 wherein said platen body of said guide is trapezoid in shape when viewed in plan so that one of the two parallel edges of the platen body is longer than the other of the parallel edges of the body, and said abutment means is associated with the longer edge of said body so that the abutment surface extends generally therealong.

12. The assembly as defined in claim 9 wherein said platen body of said guide includes a bottom surface having a flat portion for slidably moving across the underlying object as the router is moved across the workpiece and the abutment means of said guide is associated with said bottom surface so that the abutment surface protrudes generally away from the plane of said flat portion for abuttingly engaging the edge of the underlying object as aforesaid.

13. The guide as defined in claim 1 wherein said abutment surface is about 5.5 inches in length as measured along the length of the forward and rearward portions of the platen body.

14. The guide as defined in claim 5 wherein said abutment surface is about 5.5 inches in length as measured along the length of the forward and rearward portions of the platen body.

15. The guide as defined in claim 9 wherein said abutment surface is about 5.5 inches in length as measured along the length of the forward and rearward portions of the platen body.

* * * * *